Patented Apr. 7, 1953

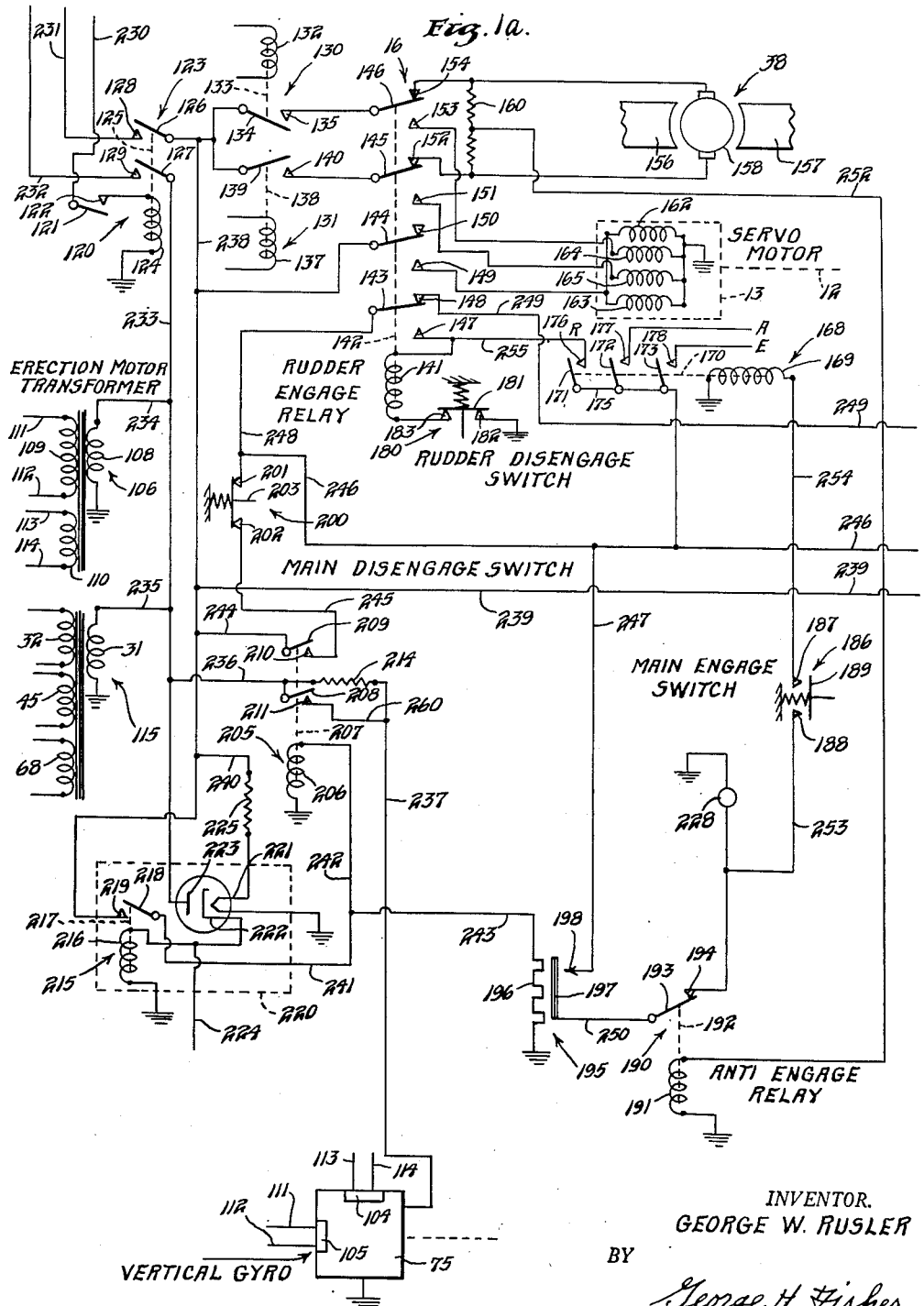

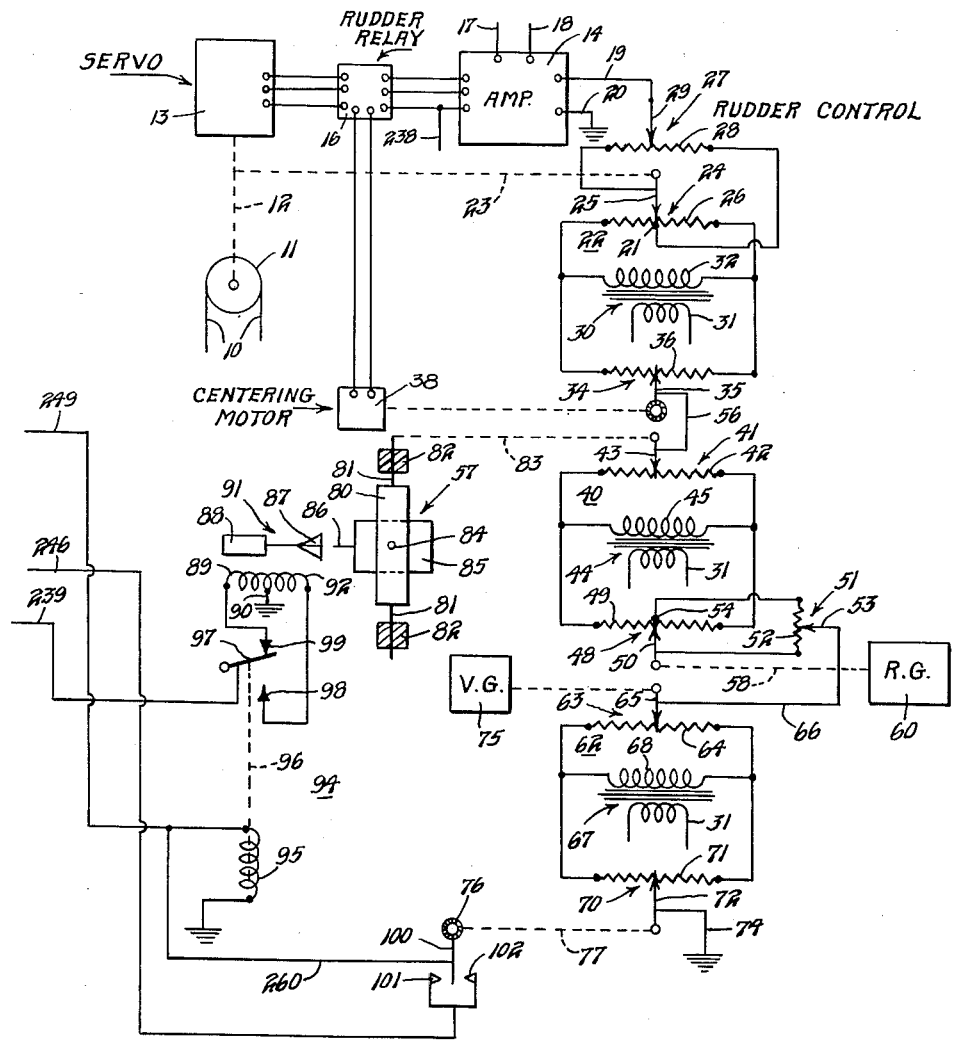

2,634,391

UNITED STATES PATENT OFFICE 2,634,391

AUTOMATIC PILOT

George W. Rusler, Minneapolis, Minn., assignor to Minneapolis-Honeywell Regulator Company, Minneapolis, Minn., a corporation of Delaware Application July 23, 1948, Serial No. 40,312

17 Claims. (Cl. 318—489)

This invention pertains to automatic steering mechanisms for dirigible craft of the type commonly known as automatic pilots for aircraft. This invention is more particularly concerned with an interlocking arrangement for an automatic pilot.

An aircraft provided with an automatic pilot has control surfaces which generally may be alternatively controlled by the automatic pilot or by direct manual operation.

One form of automatic pilot is provided with power means which may be placed in association with the control surfaces to operate them. The power means is controlled by electrical signal deriving devices which are connected to a source of supply voltage. The signal devices are operated by stabilizing means which stabilizing means thus control the power means to operate the control surfaces to thereby maintain the aircraft in a desired position. The association of the power means with the control surfaces is manually controlled.

It is an object of this invention to automatically disassociate said power means from said control surfaces upon failure of voltage supply to said signal devices and to prevent such future association until said supply is reestablished.

The stabilizing means for operating one such signal device may comprise a gyroscope whose rotor is maintained automatically in a desired position. The rotor generally is not initially at this desired position but must be precessed to this position. It is a further object of this invention to provide an interlock arrangement whereby a rapid initial precession is provided resulting in the approach to said position by the rotor. This rapid precession is obtained during less than normal rotational speed of the rotor with the rotor thereafter being permitted to attain full rotational speed all before the association of said power means and said control surfaces may be effected.

It is a further object of this invention to provide a balanceable control system for controlling a servomotor including means for balancing said system while said motor is not being utilized and comprising interlock means whose operation is initiated with the connection of said system to a source of voltage to provide a period of time for rebalancing said system before said servomotor may be utilized.

It is a further object of this invention to provide such balanceable control system with signal providing elements responsive to changes in direction and attitude and with interlock means to prevent association of said system with said servomotor until the elements of said system have had a period to approach a desired normal balanced position.

These and further objects of this invention will become apparent from a consideration of the following description taken in connection with the accompanying drawings wherein: Figures 1A and 1B together illustrate apparatus for controlling one control surface of an aircraft.

The type of automatic pilot to which this invention has been applied may control the aircraft about the vertical axis, the roll axis, and the pitch axis. For the purpose of simplifying the disclosure, the invention is illustrated as it is applied to the rudder control of the automatic pilot. The extension to the aileron control as well as the elevator control will be apparent as the description proceeds.

Figure 1B of the drawing illustrates an arrangement for controlling the rudder of the aircraft. The rudder (not shown) which controls the aircraft about its vertical axis is operated by cables 10 extending from a cable drum 11 carried by a shaft 12 which is driven by a servomotor 13. The servomotor 13 is reversibly controlled by an amplifier 14 through a rudder relay 16 to be described. The amplifier servomotor combination may be of the type disclosed in the application of Willis H. Gille, Serial Number 447,989.

Amplifier 14 is provided with leads 17, 18 connected to a source of alternating voltage such as the ship's supply. The amplifier 14 is also provided with signal input connections 19, and 20 which are connected to a signal circuit to be described. The direction of rotation of servomotor 13 depends upon the phase relationship between the voltage applied across the power input leads 17, 18 and that applied across the signal input connections 19, 20. The signal input circuit extends from connection 19, network 22, lead 56, network 40, lead 66, network 62, lead 74 to ground and to the grounded lead 20 of amplifier 14.

The network 22 comprises a follow up potentiometer 24, a rudder ratio potentiometer 27, a transformer 30, and a centering potentiometer 33. The potentiometer 24 has a resistor 26 which is connected across the ends of a secondary winding 32 of transformer 30. A slider 25 of potentiometer 24 is operated over the surface of resistor 26 by a follow up connection 23 extending from the servomotor shaft 12. The potentiometer 27 has a resistor 28 which is connected across the slider 25 and a center tap 21 of resistor 26. The potentiometer 27 includes an adjustable tap 29 which may be manually positioned over resistor 28 and which is connected to the input lead 19 of amplifier 14. Potentiometer 34 includes a resistor 36 which is connected across the ends of secondary winding 32 in parallel with resistor 26. Potentiometer 34 includes a slider 35 which may be manually adjusted over resistor 36 or may be operated automatically by a centering motor 38 to be described. Transformer 30 includes a primary winding 31.

Network 40 consists of a directional gyro rudder potentiometer 41 having a resistor 42 and an adjustable slider 43; a transformer 44 having a primary winding 31 and a secondary winding 45; a rudder rate gyro potentiometer 48 having an adjustable slider 50; and a rate coordination potentiometer 51 having a resistor 52 and an adjustable tap 53.

In the arrangement of network 40, resistor 42 of potentiometer 41 is connected across the ends of secondary winding 45. A lead 56 extends from slider 43 to slider 35 of the centering potentiometer 34. Slider 43 is adjusted by a directional gyro 57 to be described. Resistor 49 of potentiometer 48 is connected across the secondary winding 45 in parallel with resistor 42. Slider 50 of potentiometer 48 is operated through an operative connection 58 extending from a rate gyro 60. Resistor 52 of potentiometer 51 has one end connected to a center tap 54 of resistor 49 and has its other end connected to slider 50.

Network 62 consists of a vertical gyro rudder potentiometer 63 having a resistor 64 and an adjustable slider 65; a transformer having a primary winding 31 and a secondary winding 68; and a turn control potentiometer 70 having a resistor 71 and an adjustable slider 72. As arranged in network 62, the resistor 64 is connected across the ends of secondary winding 68. A lead 66 extends from slider 65 of the vertical gyro rudder potentiometer 63 to the slider 53 of the rate coordination potentiometer 51. The slider 65 is operated from vertical gyro 75 to be described. Resistor 71 of the turn control potentiometer is connected across the ends of secondary winding 68 in parallel with resistor 64. Lead 74 extends from slider 72 to ground. Slider 72 is operated by a manually operable turn control knob 76 through an operating connection 77.

It will now be apparent that the networks are connected in electrical series relationship in said control circuit. It is further apparent by reference to network 22 that the potential of center tap 21 of resistor 26 is the same as that of the center coil of secondary winding 32. If wiper 25 be moved to the right of center tap 21, the voltage between slider 25 and center tap 21 varies with the magnitude of such movement and the phase of the voltage between the slider 25 and center tap 21 has one phase with respect to the voltage across the secondary winding 32. If slider 25 be moved to the left of center tap 21 it is apparent that the voltage between the slider 25 and center tap 21 varies with the magnitude of such movement but the phase of such voltage is opposite to the phase of the voltage obtained when slider 25 was moved to the right of the center tap 21. Voltages of variable phase and magnitude may therefore be obtained by the movement of wiper 25 with respect to the center tap 21. From the description of the operation of slider 25, it is also evident how the sliders 35, 43, 50, 65 and 72 may be operated to provide voltages which vary in phase and magnitude. Since the networks are connected in series a resultant voltage will be applied across the amplifier connections 19 and 20. The amplifier 14 will continue to operate as long as there is a resultant signal in the input circuit thereto.

As stated previously the slider 43 is operated by a directional gyro 57. This directional gyro may be of the conventional type having three angular degrees of freedom. The directional gyro comprises an outer vertical gimbal ring 80 whose trunnions 81 are suitably supported by bearings 82 in suitable supporting means. A rotor casing 85 is trunnioned about a horizontal axis 84 in the outer gimbal ring 80. A rotor not shown is supported for rotation about a horizontal axis within casing 85 at right angles to the axis 84. Suitable means (not shown) are provided for rotating the rotor. The gyro 57 is so arranged in the aircraft that upon movement of the aircraft about its vertical axis the gyro due to its inherent stability will adjust the wiper 43 with respect to resistor 42 in proportion to the magnitude of the movement of the aircraft and also in a direction dependent upon the direction of movement of the aircraft. A stop arrangement, now shown, may be provided to limit the amount of relative movement of the trunnions 81 with respect to the bearings 82. A member 86 which extends from the left end of the casing provides a means for centering and locking the outer gimbal 80 with respect to its support bearings 82 in a manner to be described.

Coacting with the member 86 to effect the centering or caging of the directional gyro 57 is a caging mechanism 91. Mechanism 91 includes a hollow cone-shaped member 87 whose inner surface may be moved into engagement with member 86. The cone-shaped member 87 is carried by a slidable armature 88. This armature 88 may be mounted for sliding relation in any suitable means. The armature 88 coacts with a caging coil 92 and an uncaging coil 89.

The energization of the caging and uncaging coils 92, 89 is controlled by a caging relay 94. Relay 94 comprises an operating winding 95, a winding operated plunger 96 which operates a single-pole double-throw switch arm 97, an out contact 99, and an in contact 98 between which the switch arm is interposed. The winding 95 of relay 94 is controlled by a switch which may be operated from the turn control knob 76. This switch consists of a switch arm 100 which is interposed between two space contacts 101, 102 which are connected together.

The rate gyro 60 which through the operating connection 58 adjusts the slider 50 is of the type well known in the art having angular freedom about two horizontal axes but which has its movement about one axis restrained. An example of such type of rate gyro is disclosed as Ta in the patent to Thiry, 2,190,390.

Reference is now made to Figure 1A. The vertical gyro 75 that operates slider 65 of potentiometer 63 is of the electrically driven type having three degrees of movement about three axes. The gyro 75 is often referred to as a horizon gyro or a flight gyro and has its rotor mounted in a casing for rotation about a vertical axis. The rotor casing in addition is suitably supported for rotation about two respectively perpendicular horizontal axes. The gyro may be of the type disclosed in application 17,698, of John F. Schoeppel et al. The gyro 75 is provided with erecting means about the two horizontal axes for maintaining the gyro rotor vertical with respect to the earth. Such erecting means may be of the form disclosed in the aforesaid application of Schoeppel et al. The erecting means are indicated broadly at 104, 105 and are placed at right angles to one another to indicate that they erect the rotor about the two respectively perpendicular horizontal axes. The erecting means are controlled by a transformer 106 comprising a primary winding 108 and two secondary windings 109 and 110. The erecting means 104 is connected to the secondary winding 110 through suitable means 113, 114. The erecting means 105 is connected to the secondary winding 109 through suitable means 111, 112. The gyro 75 is so positioned in the aircraft that upon tilt of the aircraft about the roll axis the slider 65 will move along resistor 64. The rotor of vertical gyro 75 may be driven by a capacitor motor or other suitable driving means.

Various additional components of the apparatus whose function will be clarified in a description of the operation thereof are also illustrated in Figure 1A. These components include an autopilot master switch 120 which may be a single-pole single-throw knife switch comprising switch arm 121 and its coacting contact 122. Switch 120 controls the energization of a power relay 123. The power relay comprises an operating coil 124, an operable plunger 125, two single-throw switch arms 126, 127 and their respective contacts 128, and 129.

There are provided two amplifier relays 130 and 131. The first relay 130 consists of an operating coil 132, a winding operated plunger 133, a single-throw switch arm 134, and a contact 135 with which arm 134 coacts. The second relay 131 consists of an operating coil 137, a winding operated plunger 138, a single-throw switch arm 139, and a contact 140. The power relay 123 supplies D. C. voltage to the switch arms 134, 139 of amplifier relays 130, 131. While the relays 130 and 131 of the rudder control only have been illustrated, the automatic pilot amplifier as disclosed in the aforesaid application 447,989 includes a pair of relays each for the elevator and aileron control as well.

The relays 130 and 131 control the direction of rotation of centering motor 36 and servomotor 13 through a rudder engage relay 16. The operative parts of relay 16 consist of an operating coil 141, a winding operated plunger 142, and four plunger operated arms 143, 144, 145 and 146. The switch arm 143 coacts with an out contact 148 and an in contact 147. The switch arm 144 coacts with an out contact 150 and an in contact 149. The switch arm 145 coacts with an out contact 152 and an in contact 151. The switch arm 146 coacts with an out contact 154 and an in contact 153.

The centering motor 36 may be of the permanent magnet type having field elements consisting of permanent magnets 156 and 157 and a wound armature 158. Across the armature 158 is connected a center tapped resistor 160.

The servomotor 13 has two brake operating solenoids 162 and 163 and two clutch operating solenoids 164 and 165 which are more particularly disclosed in application 447,989 and which are associated with the rudder engage relay 16.

The operation of the rudder engage relay 16 is controlled by a master engage relay 168. The operative parts of the relay 168 consist of an operating winding 169, a winding operated plunger 170, and single-throw switch arms 171, 172 and 173. The arms 171, 172 and 173 are pivoted to a common bus bar 175. Switch arm 171 coacts with a rudder engage relay in contact 176. Switch arm 172 coacts with an aileron engage relay in contact 177. Switch arm 173 coacts with an elevator engage relay in contact 178.

The circuit through the rudder engage relay winding 141 may be broken by a normally closed rudder disengage switch 180 comprising a contact bridge member 181 and contacts 182 and 183 coacting with the bridge member. The switch 180 as stated is normally closed but may be temporarily opened.

The circuit through the winding 169 of the main engage relay 168 is controlled by several switch elements connected in series relation. This series circuit includes firstly a main engage switch 186 consisting of contacts 187 and 188 and a bridge member 189 coacting therewith. The switch 186 is of the normally open momentarily closed type. This circuit secondary includes an antiengage relay 190. The relay 190 consists of an operating winding 191, a winding operated plunger 192, a plunger operated switch arm 193, and an out contact 194.

The series circuit thirdly includes a thermal delay switch 195. Switch 195 consists of a heater element 196, a bimetal element 197, and an in contact 198 with which the bimetal coacts.

This circuit fourthly includes a main disengage switch 200 comprising two space contacts 201, 202 with a member 203 coacting with the contacts. The switch 200 is of the normally closed temporarily opened type.

The circuit fifthly includes an A. C.-D. C. failure relay. The relay 205 consists of an operating winding 206, a winding operated plunger 207, and plunger operated switch arms 208, 209. Switch arm 208 coacts with an in contact 211. Switch arm 209 coacts with an in contact 210.

This series circuit finally includes the power relay 124 previously described.

The A. C.-D. C. failure relay 205 also controls the circuit through the driving motor for the rotor of vertical gyro 75. Ordinarily the circuit to the motor passes through a dropping resistor 214 which resistor is shunted by switch arm 208 and in contact 211 on the operation of the relay 205.

The winding 206 of the failure relay 205 is controlled by a pilot relay 215. This pilot relay 215 is located in the rectifier portion of the amplifier. The relay 215 consists of an operating winding 216, a winding operated plunger 217, a plunger operated switch arm 218, and an in contact 219.

The amplifier of the aforesaid Gille application discloses a rectifier section which provides full wave rectification. For simplification of disclosure this rectifier is illustrated herein as a simple half-wave rectifier 220. The rectifier 220 includes a single tube having a heater element 221, a cathode 222, and a plate or anode 223. The heater element 221 is connected in series with other filaments of tubes in the amplifier which other filaments are indicated generally by resistor 225. The output lead 224 of rectifier 220 is in parallel with the winding 216 of the pilot relay 215 which winding becomes energized when the rectifier becomes conducting.

The components of the apparatus illustrated in Figure 1A are associated with the rudder channel of the automatic pilot. However, it should be borne in mind that in addition to providing a pair of amplifier operated relays similar to relays 130 and 131 each for the aileron and elevator section, that the rudder engage relay, the centering motor, the servomotor, and the individual disconnect switches are also duplicated for the aileron and elevator section of the automatic pilot. The manner in which the duplicated elements are associated in the automatic pilot will be clarified from a description of the operation below.

*Operation*

The association of the automatic pilot with the control surfaces of an aircraft will become apparent by a consideration of the operation. Suppose the pilot of the aircraft desires to fly by automatic pilot. To this end, the pilot initially closes the autopilot switch 120. D. C. voltage is thereby applied from a suitable source through lead 230, switch arm 121, contact 122, relay winding 124 to ground. The power relay 123 thus becomes energized and operates switch arms 126, and 127. A. C. voltage which may be obtained from the ship's supply is thereby transmitted from lead 232, contact 129, switch arm 127, lead 233, lead 234, primary winding 106 of transformer 106 to ground whereby the erection motor transformers are energized. A. C. voltage is also applied from the energized lead 233, lead 235, bridge transformer primary winding 31 to ground whereby the bridge network secondary windings 32, 45, 68 Figures 1A, are energized. Alternating voltage is also applied from energized lead 233, lead 236, resistor 214, lead 237, to the driving motor for the vertical gyro rotor 75. A. C. voltage is also applied to the portion of the Figure 1B amplifier which controls the servomotors and to the rectifier plate 223.

The operation of power relay 123 also supplies D. C. voltage from a suitable source to lead 231, contact 128, switch arm 126, to the main D. C. bus 238. D. C. voltage is thereupon applied to the amplifier relay switch arms 134 and 139. D. C. voltage is also applied from energized bus 238, lead 239, switch arm 97, contact 99, uncaging coil 89, to ground whereby the caging mechanism 91 is energized to uncage directional gyro 57. D. C. voltage is also applied from energized bus 238, lead 240 to the heater elements in the servomotor control section of the amplifier represented by resistor 225, and to the heater element 221 of rectifier 220.

With the operation of the power relay 123, it is now evident that alternating voltage is applied to the rotor motor of gyro vertical 75 through a resistor 214 whereby the voltage on the rotor motor is held to below normal value. This reduction in the rotor motor voltage prevents the speed of the rotor from building up to a normal value and permits the erecting means 104 and 105 of the vertical gyroscope 75 to more quickly erect the rotor to the vertical than if the rotor attained normal speed. Were the speed of the rotor motor permitted to attain normal value, the erection rate would be reduced. This initial rotation speed is maintained approximately for about fifteen seconds to permit the gyro rotor to approach erect position. This time interval is controlled by a time delay in the form of the pilot relay 215 and rectifier 220. After the rectifier heater element and cathode have been sufficiently "warmed up" and with an A. C. voltage on plate 223, the rectifier becomes conducting following this interval and a circuit is completed through the operating winding 216 of pilot relay 215. The pilot relay 215 thereby operates switch arm 218. Following operation of the pilot relay 215, a circuit is completed from energized D. C. bus 238, in contact 219 of relay 215, switch arm 218, lead 241, lead 242, operating winding 206 of the A. C.-D. C. failure relay to ground. A circuit is concomitantly completed from energized lead 241, lead 243, to heater element 196 of the thermal delay switch 195, and to ground.

The operation of the A. C.-D. C. failure relay 205 applies full alternating voltage to the rotor motor of gyro vertical 75 through energized lead 236, switch arm 208, in contact 211, lead 244, lead 237, to the rotor driving motor of gyro vertical 75. The rotor motor is now permitted to attain its normal operating speed.

The operation of the A. C.-D. C. failure relay 205 also extends D. C. voltage from energized bus 238, lead 244, switch arm 209, contact 210, lead 245, the closed main disengage switch 200, lead 246, lead 247, to the in contact 198 of the still unoperated thermal delay switch 195.

Concomitantly the operation of the A. C.-D. C. failure relay 205 causes a circuit to be extended from energized lead 245, main disengage switch 200, lead 248, switch arm 143, out contact 148, lead 249, coil 95 of the caging relay 94 to ground. The operation of the caging relay 94 completes a circuit from energized bus 238, lead 239, switch arm 97, in contact 98, caging coil 88 of the caging mechanism 91 to ground. The operation of the caging mechanism 91 centers and locks the directional gyro in center position.

Following a short time delay period during which it is anticipated among other things that the motor which drives the rotor of gyro 75 has approached its normal speed, the thermal delay switch 195 which has had its heater 196 energized operates. A circuit is now completed from the energized lead 247, thermal delay switch 195, to lead 250.

Concurrently with the operation of the pilot relay 215 in the rectifier section, the rectifier will have also provided control voltage to the servomotor control section of the amplifier through lead 224 as further disclosed in application 447,989.

Should the rudder control bridge of Figure 1B be in unbalanced condition at this time, the amplifier 14 will operate. One or the other of relays 130, 131 will be operated at this time depending upon the direction of unbalance of the amplifier control circuit. If the direction of unbalance cause the operation of amplifier relay 130, a circuit extended from energized switch arm 134, contact 135, switch arm 146, contact 154, and a parallel circuit through armature 158 and resistor 160 of centering motor 38, lead 252, antiengage relay coil 191, to ground. The operation of centering motor 38 tends to rebalance the input circuit of amplifier 14. It is apparent that if the direction of unbalance initially were in the opposite direction, that the relay 131 would be operated so that the centering motor 38 would rotate in an opposite direction to rebalance the input circuit of amplifier 14. As long as the centering motor rotates which is apparently as long as the input circuit of amplifier 14 is unbalanced, the antiengage relay winding 191 will be energized. After the input circuit is balanced, the winding 191 of antiengage relay 190 is no longer energized and the relay falls to the out position. A circuit is extended from energized lead 250, switch arm 193, contact 194, through indicating light 228 to ground.

The energization of indicator light 228 assures the pilot that he may now engage or condition the control surfaces for operation by the servomotors. The pilot may thus operate main engage switch 186 by momentarily depressing bridge member 189. A circuit is thus completed from energized lead 253, main engage switch 186, lead 254, winding 169 of the main engage relay 168, to ground.

The operation of the main engage relay 168 extends D. C. voltage from energized lead 246, bus bar 175, switch arm 171, contact 176, lead 255, winding 141 of the rudder engage relay 16, rudder disconnect switch 180, to ground.

The operation of the rudder engage relay 16 provides it with a holding circuit extending from energized lead 243, switch arm 143, holding contact 147, winding 141, rudder disengage switch 180 to ground. Concomitantly the aileron and elevator engage relays are operated and provide their own similar holding circuits as is provided by the rudder engage relay.

The operation of the switch arm 143 of the rudder engage relay breaks the circuit to the caging relay coil 95 and relay 94 assumes the out position. The switch arm 97 of the caging relay 94 is now in abutment with contact 99 whereby the uncage coil 89 is energized to uncage the directional gyro 57.

The operation of switch arm 144 of the rudder engage relay energizes the brake operating solenoids 162 and 163 of servomotor 13 to condition the association of the servomotor and control surface whereby the control surface assumes a braked condition. The operation of switch arms 145 and 146 in the rudder engage relay associates the amplifier relays 130 and 131 with the servomotor clutch operating coils 164 and 165 respectively. The centering motor 38 is no longer controlled by the amplifier relays when the rudder engage relay is operated. In a similar manner the elevator and aileron engage relays will have energized their servomotor brake solenoids and will have transferred the amplifier relays control effect from their respective centering motors to their respective servomotor clutch coils.

The servomotors are now conditioned for operation by their respective amplifier relays and the aircraft will be stabilized in the attitude assumed when the main engage switch 186 had been operated.

It is evident that the sequence of operation described will automatically take place even though the pilot should "ride" the main engage switch 186. The term "ride" infers that the pilot has operated the main engage switch at the same time that he has operated the autopilot switch 120. By "riding" the main engage switch it is evident that the pilot will engage the automatic pilot in the shortest possible time consonant with the proper conditioning of the apparatus.

With applicant's rectifier operated switch and should there be a failure of alternating voltage on the system, it is evident that while the aircraft would not be stabilized by the attitude responsive gyroscopes yet the servomotors and control surfaces are automatically disassociated for subsequent manual control surface operation. Such disassociation of servomotor and control surface is desirable to permit manual operation of the control surface during the emergency resulting from failure of the bridge signal supply voltage without having to overpower the servomotor brakes.

Upon failure of the alternating voltage supply or the direct voltage supply in applicant's arrangement the rectifier tube in rectifier 220 no longer is conducting and the pilot relay 215 is deenergized. The opening of the pilot relay 215 deenergizes the A. C.–D. C. failure relay 205 which opens the holding circuit for the rudder engage relay winding 141. The deenergization of the coil 141 of the rudder engage relay therefore results from either an alternating or direct voltage failure and opens the brake coil circuits to disassociate the servomotor from the control surface. Concomitantly the indicator light 228 is no longer energized thereby indicating to the pilot that he should assume manual direct operation of the control surfaces. Automatic disengagement of the autopilot and indication thereof is thus provided on failure of either supply voltage.

In order to subsequently engage the automatic pilot with the control surfaces after power failure, it will be apparent that the centering motors must again first balance the various control circuits to their respective amplifiers before the antiengage relay will be unoperated consequently no residual signal which may have arisen after power failure will remain in the respective bridge circuits to cause a lurch in the aircraft upon the subsequent operation of the main engage switch 186.

Should the pilot desire to control the aircraft through the automatic pilot while it is so engaged, with the control surfaces, he may operate the manual turn control 76 in one direction or the other depending on the direction of turn desired. The operation of the turn control knob causes the switch arm 100 to engage one or the other of spaced contacts 101, 102 from energized lead 246, lead 260, relay coil winding 95 to ground. The operation of the relay 94 results in the caging of the directional gyro 57 as stated. The adjustment of the return control knob 76 causes the movement of slider 72 with respect to resistor 71 to provide a control signal in the input circuit of amplifier 14 and in the aileron amplifier input circuit in a manner well known to those skilled in the art whereby manual turn of the aircraft is provided.

It is now evident that this invention provides a novel interlock or monitoring arrangement for an automatic pilot wherein rapid initial erection rate for the vertical flight gyro is available at reduced rotor speed and where the gyro rotor is subsequently permitted to approach normal speed and thus maximum rigidity before such gyroscope is utilized as a stabilizing element for an aircraft. Further, that on failure of the alternating voltage or the direct current voltage supply, the automatic pilot is automatically disassociated from the control surfaces and an indication is provided to this effect so that manual control may be initiated without it being necessary for the pilot to overcome the servomotor braking action; and when subsequent automatic control is to be initiated, proper safeguards become operative to prevent lurching of the aircraft.

While my invention has been disclosed in a preferred embodiment, it is apparent that various changes and arrangements thereof may be provided. I therefore do not wish my invention to be limited to the precise embodiment but only as circumscribed by the following claims.

I claim as my invention:

1. Control apparatus for an aircraft having a control surface for controlling the attitude of said aircraft about an axis, said apparatus comprising: a power means which may be operatively associated with said control surface; control means for said power means including a balanceable system having control devices for affecting its balance; means including a gyro having erecting means and responsive to movement about an axis for operating one control device; follow up means from said power means to another device; means for initiating rotation of said gyro rotor at less than normal operating speed and for energizing a first time delay device; means operated by said first time delay device for applying full energy to said gyro rotor and to a second time delay device, and means controlled by said second time delay device for associating said power means with said control surface, whereby said gyro has reached operating conditions before it controls said power means.

2. Control apparatus for an aircraft having a control surface, said apparatus comprising: power means operatively disengageably connected with said control surface; a control means for said power means including an amplifier having a rectifier for controlling the operation of said amplifier; relay means operated in response to conduction by said rectifier; means for connecting said rectifier to a source of alternating voltage; means responsive to tilt about an axis for also effecting operation of said amplifier; and means controlled by said relay means for causing said power means to be operatively engaged with said control surface.

3. Control apparatus for an aircraft having a control surface, said apparatus comprising: power means normally unoperably connected with said control surface; a control means for said power means including an amplifier having a rectifier for controlling the operation of said amplifier; relay means operated in response to conduction by said rectifier; means for connecting said rectifier to a source of alternating voltage; means responsive to tilt about an axis for also controlling operation of said amplifier; said responsive means comprising a gyroscope having a rotor energized with other than normal voltage upon operation of said connecting means; a time delay connecting means; means operated by said relay means for applying full voltage to said gyro rotor and for energizing said time delay means; and means controlled by said time delay means for operably connecting said power means with said control surface.

4. Control apparatus for a craft having a control surface, said apparatus comprising: power means operably disengageably connected with said control surface; control means for said power means said control means being normally disconnected from with power means, said control means further including an amplifier having a rectifier for controlling power to said amplifier; a balanceable control circuit for said amplifier; means for unbalancing said control circuit; relay means operative upon conduction of said rectifier; and additional means controlled by said relay means for momentarily connecting said power means with said control means and with said control surface; and means responsive to operation of said additional means and continued operation of said relay means for maintaining said connection.

5. Control apparatus for a craft having a control surface, said apparatus comprising: power means normally unoperably connected with said control surface; control means for said power means said control means being normally disconnected from said power means, said control means further including an amplifier having a rectifier for controlling power to said amplifier; a balanceable control circuit for said amplifier; means for unbalancing said control circuit; means for rebalancing said control circuit while said control means and power means are disconnected; relay means operative upon conduction of said rectifier; an additional means controlled by said relay means for momentarily connecting said power means with said control means and with said control surface; and means responsive to operation of said additional means and continued operation of said relay means for maintaining said connection.

6. Control apparatus for a dirigible craft, said apparatus comprising: power means adapted to be conditioned for controlling the direction of movement of said craft; means for operating said power means but normally disconnected therefrom, said control means including a balanceable system; a gyroscope having erecting means and responsive to tilt about an axis for unbalancing said system, motor means controlled by said operating means while said power means is disconnected therefrom for rebalancing said system, means for connecting said gyroscope rotor to a source of power whereby said rotor is rotated initially at less than normal speed and for initiating operation of a first time delay means; means operated by said first time delay device for applying full power to said rotor so that it may attain maximum speed and for initiating operation of a second time delay device; and means operated by said second time delay device for connecting said operating means with said power means and for conditioning said power means.

7. Control apparatus for a dirigible craft, said apparatus comprising: power means adapted to be conditioned for controlling the direction of movement of said craft; means for operating said power means but normally disconnected therefrom, said control means including a balanceable system; a gyroscope having erecting means and responsive to tilt about an axis for unbalancing said system, motor means controlled by said operating means while said power means is disconnected therefrom for rebalancing said system, means for connecting said gyroscope rotor to a source of power whereby said rotor is rotated initially at less than normal speed and for initiating operation of a first time delay means; means operated by said first time delay device for applying full power to said rotor so that it may attain maximum speed and for initiating operation of a second time delay device; further means for connecting said operating means with said power means and for conditioning said power means; and circuit means for controlling operation of said further means including said second time delay device and means responsive to continued operation of said motor means.

8. Control apparatus comprising, a gyroscope provided with erecting means for its rotor; means for energizing said erecting means, for concomitantly connecting said rotor to a source of power whereby said rotor may rotate at other than normal speed, and for initiating operation of a first time delay device; means operated by said first time delay device for connecting said rotor to said source of power so that said rotor may rotate at normal speed and for initiating operation of a second time delay device; a controlled device and means operated by said second time delay device for connecting said gyroscope and said controlled device.

9. Control apparatus comprising: a vertical gyroscope having erecting means; a directional gyroscope; caging means for said directional gyroscope for centering said gyroscope rotor with respect to its support; means for connecting said vertical gyroscope rotor with a source of power whereby said rotor may be rotated at other than its normal speed, for concomitantly energizing its erecting means, and initiating operation of a first time delay device; additional means including means operated by said first time delay device for connecting said vertical gyroscope rotor to said source of power whereby said rotor may rotate at normal speed, for initiating operation of a second time delay device, and for caging said directional gyroscope rotor; and further means including means operated by said second time delay device for uncaging said directional gyroscope rotor.

10. Control apparatus for a dirigible craft, said apparatus comprising: power means adapted to be conditioned for controlling the direction of movement of said craft; means for operating said power means; means for controlling said operating means including a gyroscope responsive to tilt about an axis and having erecting means; means for initially applying less than full voltage to said gyro rotor rotating means; a first time delay device energized concomitantly with said gyro rotor rotating means; means operated by said first time delay device for applying full voltage to said rotor rotating means and for energizing a second time delay device; and means controlled by said second time delay device for effecting the conditioning of said power means.

11. Control apparatus for a dirigible craft, said apparatus comprising: power means adapted to be conditioned for controlling the direction of movement of said craft; means for operating said power means; means for controlling said operating means including a gyroscope responsive to tilt about an axis and having erecting means; means for initially applying less than full voltage to said gyro rotor rotating means; a first time delay device energized concomitantly with said gyro rotor rotating means; means operated by said first time delay device for applying full voltage to said rotor rotating means and for energizing a second time delay device; manually operable means effective upon operation of said second time delay means for effecting the conditioning of said power means; and means for maintaining said condition despite release of said manual means but upon continued operation of said first time delay device.

12. Control apparatus for a dirigible craft, said apparatus comprising: power means adapted to be conditioned for controlling the direction of movement of said craft; means for operating said power means when conditioned including a controller operable from a normal position; means including a gyroscope responsive to a movement of said craft about an axis for operating said controller; means for conditioning said power means to change craft direction upon operation of said power means; means for caging and uncaging said gyroscope means, a time delay device, means for energizing the time delay device to effect an operation thereof and for concomitantly operating said caging mechanism to uncage position, means effective upon operation of said time delay device and to nonoperation of said conditioning means for said power means for operating said mechanism to cage position, and means for operating said conditioning means and for simultaneously moving said mechanism to uncage position.

13. Control apparatus comprising: a vertical gyroscope of the electrically driven type having erecting means; a directional gyroscope; caging means for said directional gyroscope for centering said gyroscope rotor with respect to its support; means including a resistor for connecting said vertical gyroscope rotor with a source of electrical power whereby said rotor may be rotated at other than its normal speed and for concomitantly energizing its erecting means; a first time delay device; means for initiating operation of said first time delay device; additional means including relay means operated by said first time delay device an operation thereof for shunting said resistor and connecting said vertical gyroscope rotor directly to said source of power whereby said rotor may rotate at normal speed, for initiating operation of a second time delay device, and for caging said directional gyroscope rotor; and means including a manually operable switch and a relay operated by said second time delay device for uncaging said directional gyroscope rotor; indicating means operated by said second time delay device; power means; operable control means for said power means including a plurality of operation initiating devices; means for operating one initiating device by said vertical gyroscope; and means for operating a second initiating device by said directional gyroscope.

14. Control apparatus for a dirigible craft, said apparatus comprising: power means adapted to be conditioned for controlling on subsequent operation thereof the direction of movement of said craft; an amplifier, having two control circuit terminals and two power input terminals, for reversibly operating said power means depending on the phase relation of the voltage across said pairs of terminals; electronic rectifier means; a control circuit for said amplifier connected to said control circuit terminals; means for energizing said input terminals, said control circuit, and said rectifier plate from a source of alternating voltage; additional means including means energized by conduction of said rectifier means and a manually operable switch for conditioning said power means, and means responsive to change in direction of movement of said craft for setting up a control signal in said control circuit.

15. Control apparatus for an aircraft comprising: power means which is normally unoperably connected with a control surface of the aircraft; control means for operating said power means; gyroscope means for operating said control means; means including a thermionic tube; means for energizing rotation means for the gyroscope rotor at less than full value and for energizing said thermionic tube; means operated on conduction of said thermionic tube for fully energizing said rotor rotation means; means including a thermal responsive switch energized on conduction of said thermionic tube; and means including means controlled by said thermal responsive switch for operably connecting said power means with said control surface.

16. Control apparatus for a dirigible craft, said apparatus comprising: power means adapted to be conditioned for controlling the direction of movement of said craft; means for operating said power means; means for controlling said operating means including a gyroscope responsive to tilt about an axis and having erecting means; means for initially applying less than full voltage to said gyro rotor rotating means; a first time delay device energized concomitantly with said gyro rotor rotating means; means operated by said first time delay device for applying full voltage to said rotor rotating means and for energizing a second time delay device; manually operable means effective upon operation of said second time delay means for effecting the conditioning of said power means; means for maintaining the conditioning of said power means; and means responsive to unoperation of said first time delay device for rendering said maintaining means ineffective.

17. Control apparatus for a craft having a control surface, said apparatus comprising: power means normally disengageably connected with said control surface; control means for said power means said control means being adapted to be connected with said power means, said control means further including an amplifier having a rectifier for controlling power to said amplifier; a balanceable control circuit for said amplifier; means for unbalancing said control circuit; means for rebalancing said control circuit while said control means and power means are disconnected; relay means operative upon conduction of said rectifier; an additional means controlled by said relay means for momentarily engageably connecting said power means with said control means and with said control surface; means responsive to operation of said additional means for maintaining said connection; and means responsive to subsequent unoperation of said relay means for rendering said maintaining means ineffective until further conduction of said rectifier.

GEORGE W. RUSLER.

REFERENCES CITED

The following references are of record in the file of this patent:

UNITED STATES PATENTS

| Number | Name | Date |
|---|---|---|
| 1,896,805 | Sperry et al. | Feb. 7, 1933 |
| 2,344,126 | Carlson | Mar. 14, 1944 |
| 2,429,605 | Brannin | Oct. 28, 1947 |
| 2,464,629 | Young | Mar. 15, 1949 |

FOREIGN PATENTS

| Number | Country | Date |
|---|---|---|
| 102,197 | Sweden | July 29, 1941 |
| 820,614 | France | Nov. 16, 1937 |